US009019511B2

(12) United States Patent
Polidor

(10) Patent No.: US 9,019,511 B2
(45) Date of Patent: Apr. 28, 2015

(54) OPTICAL PROBE FOR VISION MEASUREMENTS

(75) Inventor: Edward T. Polidor, Webster, NY (US)

(73) Assignee: Quality Vision International, Inc., Rochester, NY (US)

( * ) Notice: Subject to any disclaimer, the term of this patent is extended or adjusted under 35 U.S.C. 154(b) by 542 days.

(21) Appl. No.: 13/405,391

(22) Filed: Feb. 27, 2012

(65) Prior Publication Data

US 2013/0222794 A1     Aug. 29, 2013

(51) Int. Cl.
G01N 21/88 (2006.01)
B32B 37/12 (2006.01)
B32B 37/14 (2006.01)
B23P 17/04 (2006.01)
G01B 11/00 (2006.01)
G01B 5/012 (2006.01)

(52) U.S. Cl.
CPC ............. G01B 11/007 (2013.01); *Y10T 29/49* (2015.01); G01B 5/012 (2013.01)

(58) Field of Classification Search
USPC .......... 356/613–616; 250/561, 227.1, 227.21, 250/559.29
See application file for complete search history.

(56) References Cited

U.S. PATENT DOCUMENTS

| 4,714,346 A | 12/1987 | Eichen et al. |
| 5,118,956 A * | 6/1992 | Dunning et al. ......... 250/559.29 |
| 5,326,982 A * | 7/1994 | Wiklund ................. 250/559.19 |
| 5,377,420 A * | 1/1995 | Vesco et al. ..................... 33/559 |
| 5,615,489 A | 4/1997 | Breyer et al. |
| 5,677,525 A | 10/1997 | Völcker et al. |
| 5,825,666 A * | 10/1998 | Freifeld ........................ 702/153 |
| 6,633,051 B1 * | 10/2003 | Holloway et al. ......... 250/559.29 |
| 6,651,351 B1 | 11/2003 | Christoph et al. |
| 7,178,253 B2 * | 2/2007 | Ruijl et al. ...................... 33/559 |
| 7,227,647 B2 | 6/2007 | Ferger |
| 7,847,955 B2 * | 12/2010 | McFarland et al. ........... 356/614 |
| 2005/0259271 A1 | 11/2005 | Christoph |

FOREIGN PATENT DOCUMENTS

| JP | 05-087556 A | 4/1993 |
| JP | 08-248322 A | 9/1996 |
| KR | 10-2011-0129604 A | 12/2011 |

OTHER PUBLICATIONS

PCT—International Search Report dated May 13, 2013 in corresponding PCT International Application No. PCT/US2013/025586 (3 pages).
PCT—Written Opinion of the International Searching Authority dated May 13, 2013 in corresponding PCT International Application No. PCT/US2013/025586 (6 pages).

* cited by examiner

*Primary Examiner* — Sang Nguyen
(74) *Attorney, Agent, or Firm* — Brian B. Shaw, Esq.; Thomas B. Ryan; Harter Secrest & Emery LLP

(57) ABSTRACT

A coordinate measurement machine having a feeler whose position is determined optically and a lens for use in such a machine and a method for making a lens for a coordinate measurement machine, having a flexible feeler having a sensing tip, positioned substantially at the focal point of the objective lens.

5 Claims, 7 Drawing Sheets

OPTICAL PROBE FOR VISION MEASUREMENTS

BACKGROUND OF THE INVENTION

Field of the Invention

This invention relates generally to coordinate measurement machines having feelers whose position is determined optically and more particularly to such a machine, a lens for use in such a machine, and a method for making a lens for a coordinate measurement machine, having a flexible feeler having a sensing tip positioned substantially at the focal point of the objective lens.

Optical measuring instruments of the type with which this invention is concerned are shown for example in Christoph et al. U.S. Pat. No. 6,651,351. Christoph describes a feeler element connected via an elastic-to-bending shaft as a feeler extension to the coordinate measuring instrument. The arrangement of Christoph has a number of disadvantages including a complex mounting arrangement that makes it difficult to insure that the tip of the probe is positioned and remains at the focal point of the lens and the need to provide relatively complex optics for imaging the sensor element.

It is an object of this invention to provide a coordinate measuring instrument that overcomes these disadvantages.

Briefly stated and in accordance with a presently preferred embodiment of this invention, a coordinate measurement instrument for inspecting an object under measurement includes an objective lens through which the object under measurement can be imaged, a flexible feeler attached to the optical center of the objective lens and extending from the lens towards the object under measurement, the flexible feeler comprising a feeler extension attached to the lens at one end and terminating in a sensing end or tip.

In accordance with another embodiment of the invention, a sensing end of the feeler extension is positioned approximately at a focal point of the objective lens.

In accordance with another aspect of the invention, a coordinate measuring instrument includes a mount for interchangeably receiving objective lenses and a plurality of objective lenses of different focal lengths that can be received in the mount.

In accordance with a further aspect of the invention, a combination objective lens and probe for a coordinate measuring instrument includes an objective lens having an aperture disposed along the optical axis of the lens, a hollow tube of suitably stiff material, e.g. stainless steel, brass, or titanium, having an outside diameter slightly smaller that the diameter of the aperture and having one end positioned and secured in the aperture, and an optical fiber having an outside diameter slightly smaller than the inside diameter of the tube having one end positioned and secured in the tube and the other end of the optical fiber terminating in a tip disposed at least approximately at the focal point of the objective lens.

In accordance with another aspect of the invention, the end of the tube is secured within the aperture in the lens by an adhesive.

In accordance with another aspect of the invention, the end of the fiber is secured within the tube by an adhesive.

In accordance with a still further aspect of the invention, a method of making a combined objective lens and probe for a coordinate measuring instrument includes the steps of providing an objective lens suitable for use in the instrument; forming an aperture in the lens disposed at least substantially along the optical axis of the lens; providing a hollow tube having an outside diameter selected to fit within the aperture; securing the tube within the aperture; providing an optical fiber having an outside diameter selected to fit within the tube; forming a sensing tip on one end of the fiber; positioning the fiber in the tube; adjusting the position of the fiber so that the tip is located at least approximately at the focal point of the lens and securing the fiber in the tube.

The novel aspects of the invention are set forth with particularity in the appended claims. The invention itself together with further objects and advantages thereof may be more readily understood by reference to the following detailed description of several presently preferred embodiments thereof taken in conjunction with the accompanying drawing, in which:

DETAILED DESCRIPTION OF THE DRAWING

DETAILED DESCRIPTION OF THE INVENTION

Figure 1:
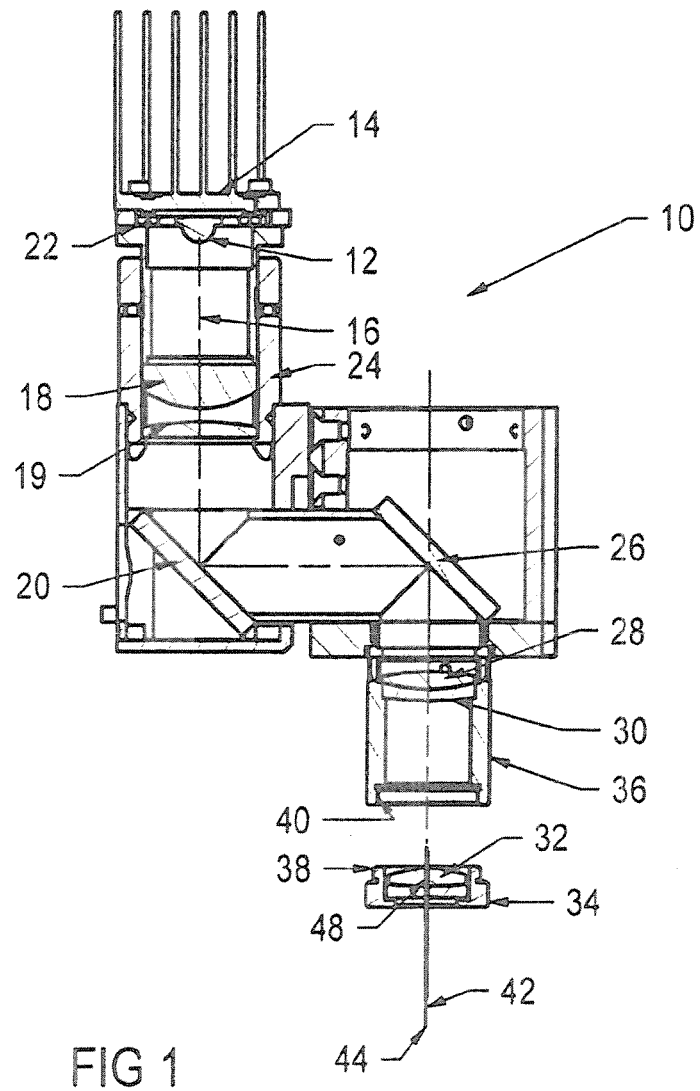
FIG. 1 is a drawing, partly in section, of a coordinate measurement machine in accordance with this invention.

As shown in FIG. 1, the instrument indicated generally at 10 includes a light source 12 which may be a solid state light source such as an LED or laser diode, an incandescent light source, or any other source suitable for illuminating an object under inspection. The light source 12 is thermally coupled to a heat sink 14. The light source 12 emits light at least along an optical axis 16 that passes through lenses 18 and 19 to a mirror 20. Preferably, in accordance with one embodiment of the invention, the light source is configured within a mounting fixture 22 that is received within a lens housing 24.

Light from the light source 12 is reflected by mirror 20, a second preferably parallel mirror 26, and thence through a pair of lens elements 28 and 30 that direct the light to an objective lens 32 that may be made from one or more lens elements and is mounted in a removable lens mount 34 that is received within the end of housing 36. Preferably, the lens mount 34 and the housing 36 have complimentary threads 38 and 40 or other complementary fasteners respectively for removably receiving the lens mount 34 in the end of the housing 36.

Figure 2:
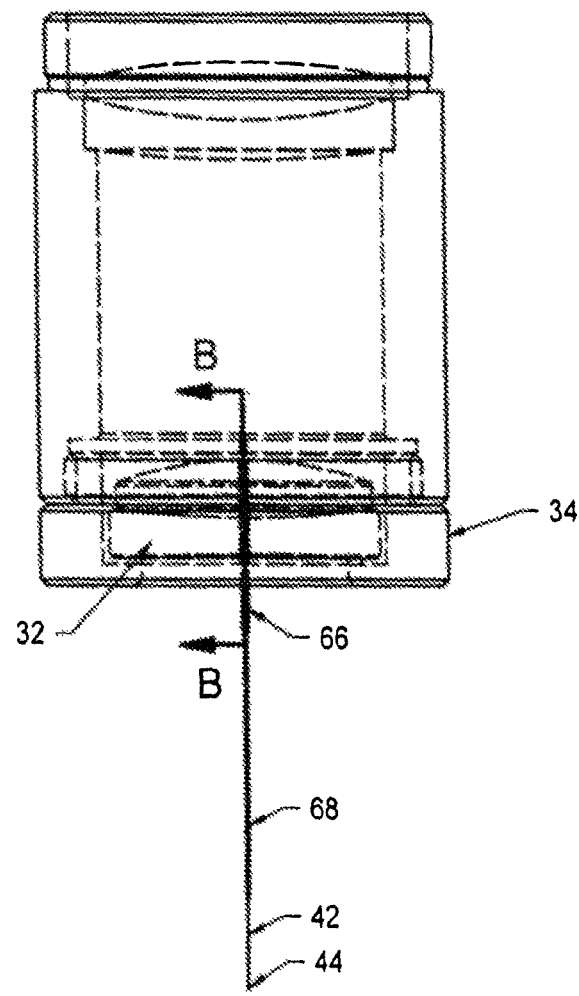
FIG. 2 is a side elevation, partly in section of an objective lens assembly with a feeler assembly in accordance with this invention.
Figure 3:
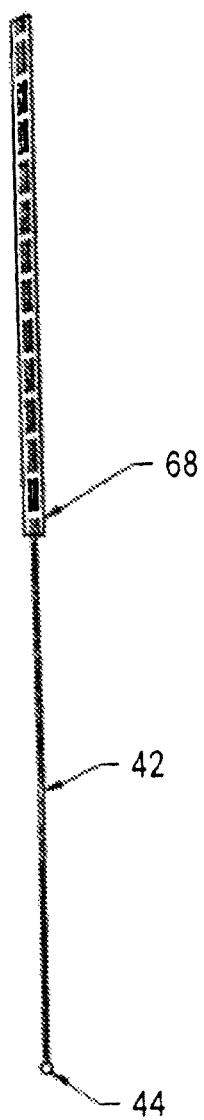
FIG. 3 is an enlarged view of a distal end of a feeler assembly as shown in FIG. 2.
Figure 5:
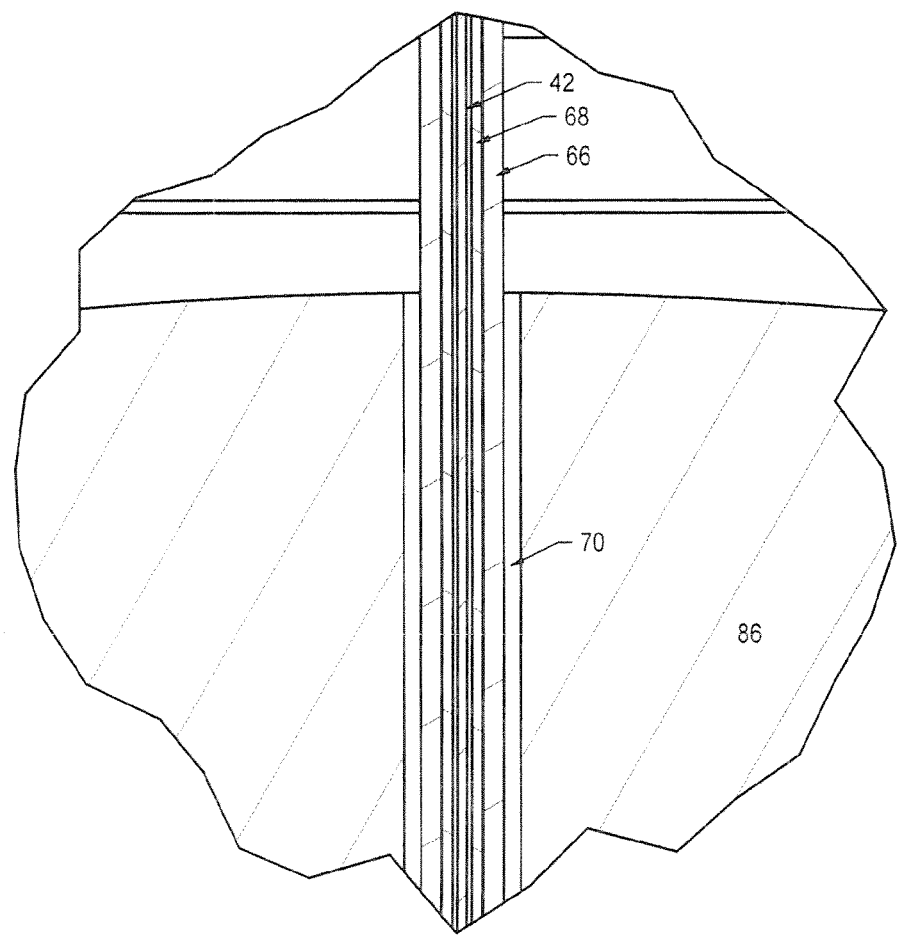
FIG. 5 is an enlarged fragmentary view, in section, of the interface between the feeler assembly and the lens.

Referring now to the objective lens assembly as shown in FIG. 2, and FIG. 5, flexible feeler 42 is provided having a sensing end or tip 44 that may be spherical or any other shape suitable for making contact measurements. With one embodiment of the invention, the flexible feeler 42 comprises a fiber optic light guide having a feeler extension attached to the objective lens 32. The feeler extension that includes an inner tube 68 and an optional outer tube 66 is preferably attached to the lens, by forming an aperture 70 in the lens disposed at least substantially along the optical axis of the lens and having an inside diameter slightly larger than the outside diameter of the feeler extension. The feeler extension is positioned in the aperture. Tip 44 is formed on the end of the fiber feeler 42, for example, by heating the end until it melts to form a spherical tip. The feeler extension is positioned in the aperture 70 and adjusted so that the tip 44 is located at least approximately at the focal point of the lens and the feeler is secured in the aperture for example by adhesive. Preferably, an adhesive is applied to proximal end of the feeler before it is positioned in the aperture in the lens. The adhesive is selected such that the position of the tip 44 can be moved to position the tip at approximately the focal point of the lens before the adhesive sets and maintained at the position long enough for the adhesive to fixedly secure the feeler within the lens. UV curable adhesives or other securing methods that do not rely on an adhesive can also be used as will be appreciated by those skilled in the art.

As shown in FIGS. 2-7, in accordance with an embodiment of the invention hollow tube 66 is constructed of suitably stiff material, such as stainless steel, brass, or titanium, having an outside diameter slightly smaller that the diameter of the aperture. Tube 66 has one end 62 positioned and secured in the aperture of the objective lens 32. A second at least semi flexible hollow tube 68 is positioned within tube 66 and an optical fiber 42 having an outside diameter slightly smaller than the inside diameter of the semi-flexible tube 68 has one end positioned and secured in the tube and the other end of optical fiber 42 terminates in tip 44 disposed at least approximately at the focal point of the objective lens.

In accordance with another aspect of the invention, the proximal end of the fiber is secured within the tube by a drop of adhesive.

Figure 4:
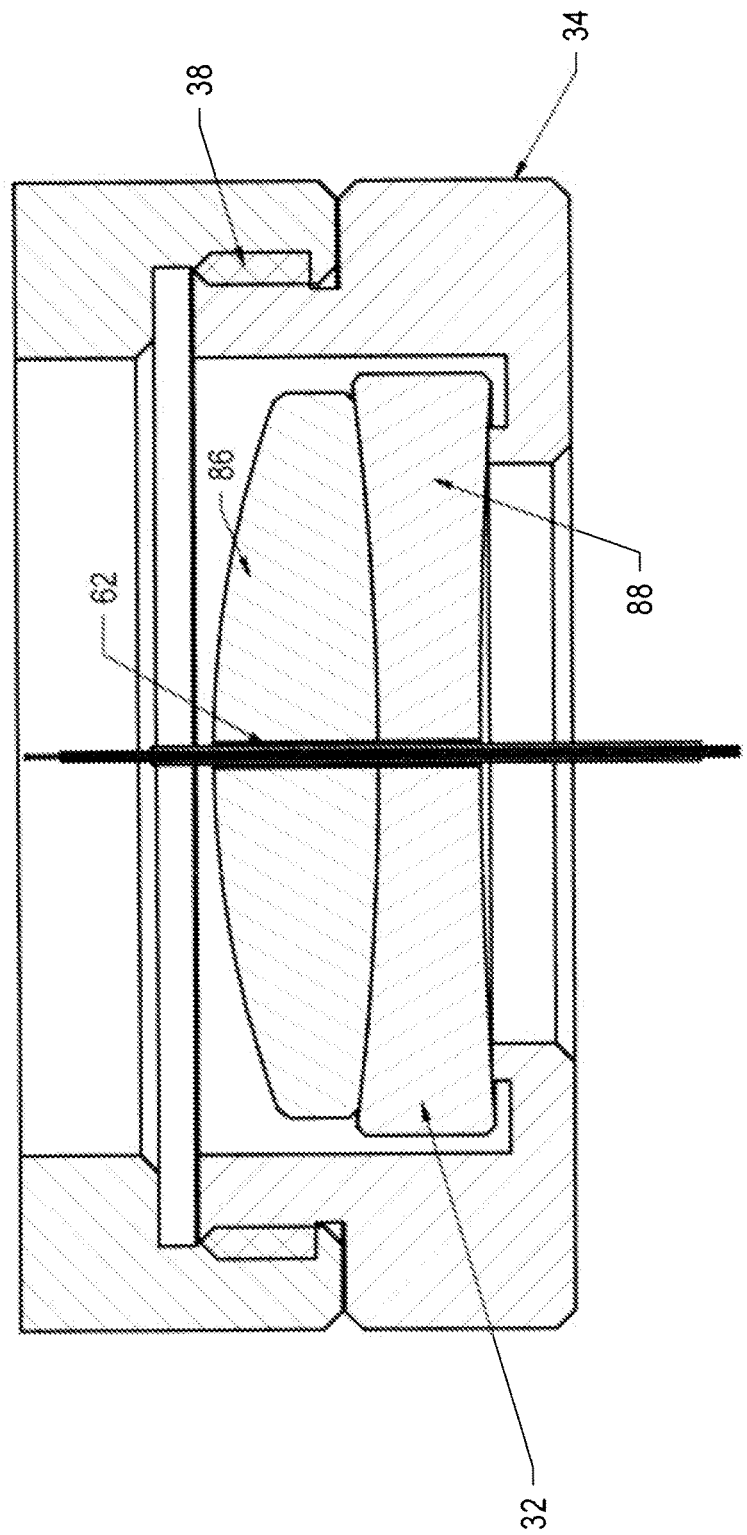
FIG. 4 is a section taken along line B-B of FIG. 2.

As shown in FIGS. 4 and 5, the fiber optic light guide is supported by the two tubes, first larger diameter tube 66, preferably a substantially rigid tube, secured in the objective lens as described above, and second, smaller tube 68, preferably a semi-flexible tube secured within the first tube and in which second tube 68 the fiber optic light guide is secured. The first tube 66 has an outside diameter slightly smaller than the diameter of aperture 70 extending through the objective lens 32 leaving a space therebetween for receiving a layer of adhesive, and an inside diameter selected to receive the second tube. The second tube has an inside diameter sized to receive the fiber optic light guide 42. While the preferred embodiment of the invention includes the fiber optic light guide 42 and the two progressively larger tubes 68, 66, it is contemplated in accordance with the invention it may be formed with the fiber optic light guide alone, the optic light alone with one tube, or the fiber optic light guide together with the two tubes as described above. The size of the aperture in the lens could be selected accordingly.

Figure 6:
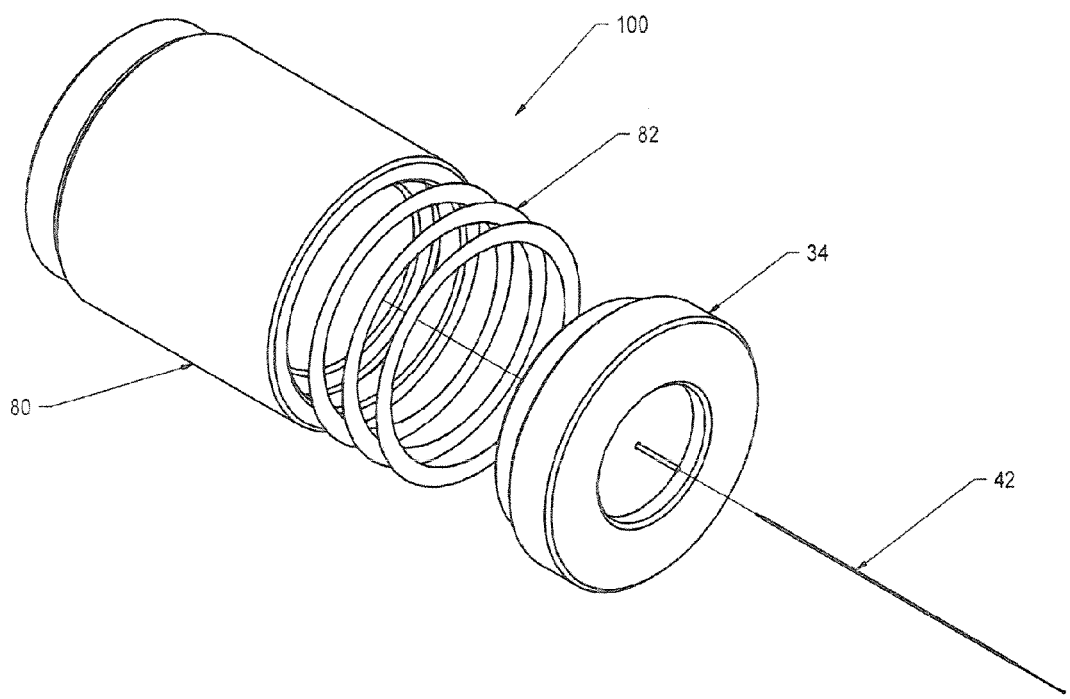
FIG. 6 is an exploded view of the objective lens assembly of FIG. 2.
Figure 7:
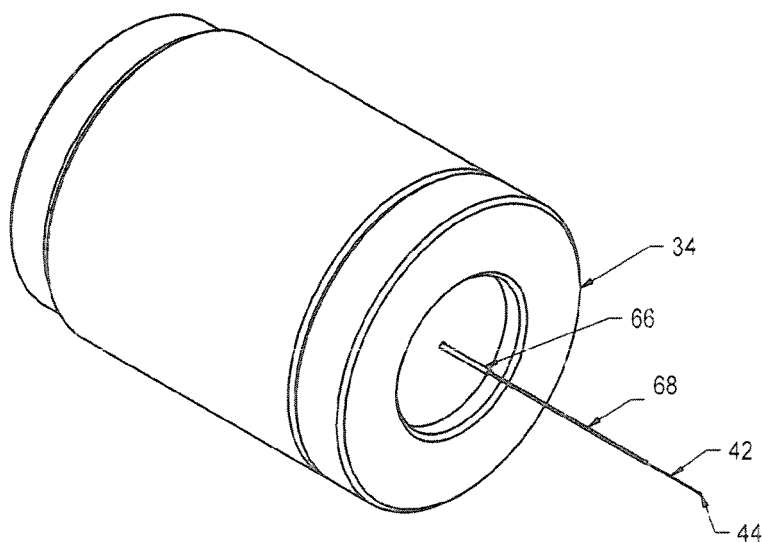
FIG. 7 is an enlarged perspective view of the distal end of the objective lens assembly showing the feeler assembly extending therefrom.

In accordance with another embodiment of the invention, the coordinate measurement of machine may be made more versatile by providing a plurality of objective lenses assemblies 100 as shown in FIG. 6. each having a feeler attached thereto terminating in a sensing end that is positioned at least approximately at the focal point of the lens. Objective lens assembly 100 includes a body 80 into which they preferably flat helical spring 82 is received. An end assembly 84 carrying one or more lens elements 86, 88 of the objective lens is attached to the body 80 preferably by a threaded connection as shown in FIG. 4.

At least a first objective lens and an additional objective lens having a focal length different from that of the first lens, and a feeler extension attached to the additional lens at one end then terminating in a sensing end positioned substantially at the focal point of the additional lens is provided. This avoids the need for recalibrating the machine each time the objective lens is changed as has been heretofore required. A mount for interchangeably receiving objective lenses and a plurality of objective lenses of different focal lengths is provided.

A method of making a combined objective lens and probe for a coordinate measuring instrument includes the steps of providing an objective lens suitable for use in the instrument; forming an aperture in the lens disposed at least substantially along the optical axis of the lens; providing a hollow tube having an outside diameter selected to fit within the aperture; securing the tube within the aperture; providing an optical fiber having an outside diameter selected to fit within the tube; forming a sensing tip on one end of the fiber; positioning the fiber in the tube; adjusting the position of the fiber so that the tip is located at least approximately at the focal point of the lens and securing the fiber in the tube.

The tube is preferably adhesively secured within the aperture in the lens.

The adjusting step preferably includes mounting the objective lens in a measuring instrument and visually adjusting the position of the fiber to bring the tip into focus.

In accordance with another embodiment, adjusting the position of the tip comprises positioning the tip approximately at the focal point of the lens, apply a drop of adhesive at the point where the outside diameter of the fiber meets the inside diameter of the tube, and maintaining the fiber and position until the adhesive sets.

While the invention has been described in connection with certain presently preferred aspects thereof, those skilled in the art will recognize that many modifications and changes may be made therein without departing from the true spirit and scope of the invention which accordingly is intended to be defined solely by the attended claims.

The invention claimed is:

1. A coordinate measuring instrument for inspecting an object under measurement comprising:
   a first objective lens for imaging the object under measurement;
   a flexible feeler attached to the optical center of the first objective lens and extending from the first objective lens towards the object under measurement, the flexible feeler comprising a first feeler extension attached to the first objective lens at one end and terminating in a sensing end;
   a mount for interchangeably receiving objective lenses and in which the first objective lens is received in the mount; and
   at least one additional objective lens having a focal length different from the first objective lens, and a second feeler extension attached to the at least one additional objective lens at one end and terminating in a sensing end positioned substantially at the focal point of the additional objective lens.

2. The coordinate measuring instrument of claim 1 in which the first feeler extension comprises an optical fiber.

3. The coordinate measuring instrument of claim 2 comprising a hollow stiff tube surrounding the optical fiber which tube is mounted in an aperture in the first objective lens that lies substantially along the optical axis of the first objective lens.

4. The coordinate measuring instrument of claim 3 in which the hollow, stiff tube comprises stainless steel.

5. The coordinate measuring instrument of claim 1 in which the sensing end of the first feeler extension is positioned approximately at a focal point of the first objective lens.

* * * * *